US008788822B1

(12) United States Patent
Riddle (10) Patent No.: US 8,788,822 B1
(45) Date of Patent: Jul. 22, 2014

(54) ENHANCED QOS SOLUTION FOR THIN CLIENT OR REMOTE ACCESS SESSIONS

(75) Inventor: Guy Riddle, Los Gatos, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 1873 days.

(21) Appl. No.: 11/149,684

(22) Filed: Jun. 10, 2005

(51) Int. Cl.
*H04L 29/06* (2006.01)

(52) U.S. Cl.
USPC .......................................... 713/169

(58) Field of Classification Search
USPC ............................................ 726/22; 713/169
See application file for complete search history.

(56) References Cited

U.S. PATENT DOCUMENTS

| | | | |
|---|---|---|---|
| 6,157,963 A * | 12/2000 | Courtright et al. ................. | 710/5 |
| 6,470,453 B1 * | 10/2002 | Vilhuber ........................... | 726/4 |
| 7,023,856 B1 * | 4/2006 | Washabaugh et al. ..... | 370/395.1 |
| 7,609,721 B2 * | 10/2009 | Rao et al. ....................... | 370/470 |
| 2003/0093800 A1 * | 5/2003 | Demas et al. ................... | 725/90 |

OTHER PUBLICATIONS

Citrix Consulting Services, *Citrix ICA Priority Packet Tagging*, Draft White Paper, Citrix, Inc., Copyright 2001.

Gettys, Jim and Nielsen, Henrik Frystyk, *SMUX Protocol Specifications: W3C Working Draft* Jul. 10, 1998, http://www.w3.org/TR/1998/WD-mux-19980710, Copyright 1998 W3C.

Spero, Simon E., *SCP-Session Control Protocol V 1.1*, http://www.ibiblio.org/ses/scp.html, University of North Carolina at Chapel Hill.

* cited by examiner

*Primary Examiner* — Michael S McNally
(74) *Attorney, Agent, or Firm* — Baker Botts L.L.P.

(57) ABSTRACT

Methods, apparatuses and systems directed to the application of network QoS policy to different data types multiplexed over a connection corresponding to a given session between a first host and a second host. In one implementation, the present invention includes a dual gateway architecture where a first gateway terminates the connection with a remote access client, demultiplexes the remote access session data stream into a plurality of separate streams for transmission to a second gateway. The second gateway re-multiplexes the separate data streams into a single remote access session data stream for transmission to a remote access server. The use of separate data streams between the first and second gateways allows for the application of individual policies on the components of the remote access session data flow. For example, a policy scheme can be configured that gives preference to mouse movements, transmitted in a first data stream, over printer traffic, transmitted in a second data stream. The present invention can also be applied to network application protocols, other than remote access protocols, that multiplex more than one "virtual channel" containing different traffic types over a single transport layer connection.

27 Claims, 7 Drawing Sheets

ENHANCED QOS SOLUTION FOR THIN CLIENT OR REMOTE ACCESS SESSIONS

CROSS-REFERENCE TO RELATED APPLICATIONS

This application makes reference to the following commonly owned U.S. patent applications and patents; which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/306,678 now U.S. Pat. No. 6,460,085 in the name of Jerome D. Toporek, Jeremy A. McCooey, Marc B. Hasson, and Timothy W. Hartrick, entitled "Method and System for Managing Memory in an Internet over Satellite Connection;"

U.S. patent application Ser. No. 09/243,185 now U.S. Pat. No. 6,529,477 in the name of Jerome D. Toporek, David C. Palter, Jeremy A. McCooey, Marc B. Hasson, Timothy W. Hartrick, and Kay A. Guyer, entitled "Internet over Satellite System;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, now U.S. Pat. No. 6,456,360, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 09/966,538, in the name of Guy Riddle, entitled "Dynamic Partitioning of Network Resources;"

U.S. patent application Ser. No. 10/015,826 in the name of Guy Riddle, entitled "Dynamic Tunnel Probing in a Communications Network;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/178,617, in the name of Robert E. Purvy, entitled "Methods, Apparatuses and Systems Facilitating Analysis of Network Device Performance;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/334,467, in the name of Mark Hill, entitled "Methods, Apparatuses and Systems Facilitating Analysis of the Performance of Network Traffic Classification Configurations;"

U.S. patent application Ser. No. 10/453,345, in the name of Scott Hankins, Michael R. Morford, and Michael J. Quinn, entitled "Flow-Based Packet Capture;"

U.S. patent application Ser. No. 10/812,198 in the name of Michael Robert Morford and Robert E. Purvy, entitled "Adaptive, Application-Aware Selection of Differentiated Network Services;" and U.S. patent application Ser. No. 10/843,185 in the name of Guy Riddle, Curtis Vance Bradford and Maddie Cheng, entitled "Packet Load Shedding."

FIELD OF THE INVENTION

The present invention relates to computer networks and, more particularly, to methods, apparatuses and systems directed to managing data flows corresponding to remote access and/or thin client sessions.

BACKGROUND OF THE INVENTION

Enterprises have become increasingly dependent on computer network infrastructures to provide services and accomplish mission-critical tasks. Indeed, the performance and efficiency of these network infrastructures have become critical as enterprises increase their reliance on distributed computing environments and wide area computer networks. The widely-used TCP/IP protocol suite, which implements the world-wide data communications network environment called the Internet and is employed in many local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily. The above-identified U.S. Patents and patent applications provide explanations of certain technical aspects of a packet based telecommunications network environment, such as Internet/Intranet technology based largely on the TCP/IP protocol suite, and describe the deployment of bandwidth management solutions to monitor and manage network environments using such protocols and technologies.

Enterprises network topologies can span a vast array of designs and connection schemes depending on the enterprises resource requirements, desired service levels, costs and the like. Enterprise network design topologies often include redundant LAN and WAN segments in the enterprises intranet, and multiple paths to extranets and the Internet. Enterprises that cannot afford the expense of private leased-lines to develop their own WANs, often employ frame relay, or other packet switched networks, together with Virtual Private Networking (VPN) technologies to connect private enterprise sites via a service provider's public network or the Internet. Some enterprises also use VPN technology to create extranets with customers, suppliers, and vendors.

Indeed, as enterprises deploy these, network technologies, an increasing number of remote and/or thin client access infrastructures have been developed to allow remote users to access centrally-managed, network applications over a computer network. The Citrix® Presentation Server, offered by Citrix Systems, Inc. of Fort Lauderdale, Fla., allows users to connect to a central server and securely access one or more network applications hosted on the enterprises network infrastructure. According to the Citrix® deployment architecture, remote users access a central remote access server with a remote access client application. The remote access server and client communicate using the Independent Computing Architecture (ICA) protocol, a protocol that operates at the application, presentation and session layers of the OSI reference model. The ICA protocol and architecture separates screen updates and user input processing from the rest of the application logic and processing functions. When using a remote access client, application logic executes on the remote access server and only screen updates, mouse movements and keystrokes, are transmitted over the ICA session between the server and client. According to the Citrix architecture, virtual channel drivers, corresponding to different aspects of the ICA session, provide virtual channel data in the form of ICA command packets to a driver that packages the data into metaframes. The metaframes are ultimately provided to a TCP/IP protocol stack for transmission across the network. The Citrix protocol also features Priority Packet Tagging, which allows for Quality of Service (QoS) solution by allowing the ability to prioritize within ICA sessions based on the virtual channel data being transmitted.

Generally speaking, however, an ICA session operates using a single, persistent TCP connection between the remote access client and server. While the priority tags discussed above allow a QoS solution to distinguish between, and therefore, prioritize different ICA sessions, this scheme is problematic to a QoS solution that would allow for differentiated treatment of various data flows within a given ICA session. For example, applying a priority scheme to data frames corresponding to a single ICA session over a persistent TCP connection is problematic, since prioritizing some packets over others may result in out-of-order packet transmissions which may cause the TCP functionality on the receiving end system to cease to operate in a workable manner. Accordingly, it is difficult to prioritize ICA command packets carrying mouse movement data over printer traffic.

In light of the foregoing, a need in the art exists for methods, apparatuses and systems that allow for network QoS solutions to prioritize the flow of data within a remote access session. Embodiments of the present invention substantially fulfill this need.

SUMMARY OF THE INVENTION

The present invention provides methods, apparatuses and systems directed to the application of network QoS policy to different data types multiplexed over a connection corresponding to a given session between a first host and a second host. In one implementation, the present invention operates in a network comprising a first host and a second host, wherein the first host and the second host are operative to establish a session comprising the multiplexing of data, differentiated over an axis, for transmission over a transport layer connection. In one implementation, the present invention involves de-multiplexing based on the axis, at a first gateway, the transport layer connection between the first host and the second host into a plurality of data streams, and transmitting the plurality of data streams over corresponding transport layer connections to a second gateway.

In one implementation, the present invention allows for management of data flow within remote access sessions between a remote access client and server. In one implementation, the present invention includes a dual gateway architecture where a first gateway terminates the connection with a remote access client, demultiplexes the remote access session data stream into a plurality of separate streams for transmission to a second gateway. The second gateway re-multiplexes the separate data streams into a single remote access session data stream for transmission to a remote access server. The use of separate data streams between the first and second gateways allows for the application of individual policies on the components of the remote access session data flow. For example, a policy scheme can be configured that gives preference to mouse movements, transmitted in a first data stream, over printer traffic, transmitted in a second data stream. The present invention can also be applied to network application protocols, other than remote access protocols, that multiplex more than one "virtual channel" containing different traffic types over a single transport layer connection.

DESCRIPTION OF PREFERRED
EMBODIMENT(S)

A. Network Environment and Data Flow Device Configuration

Figure 1:
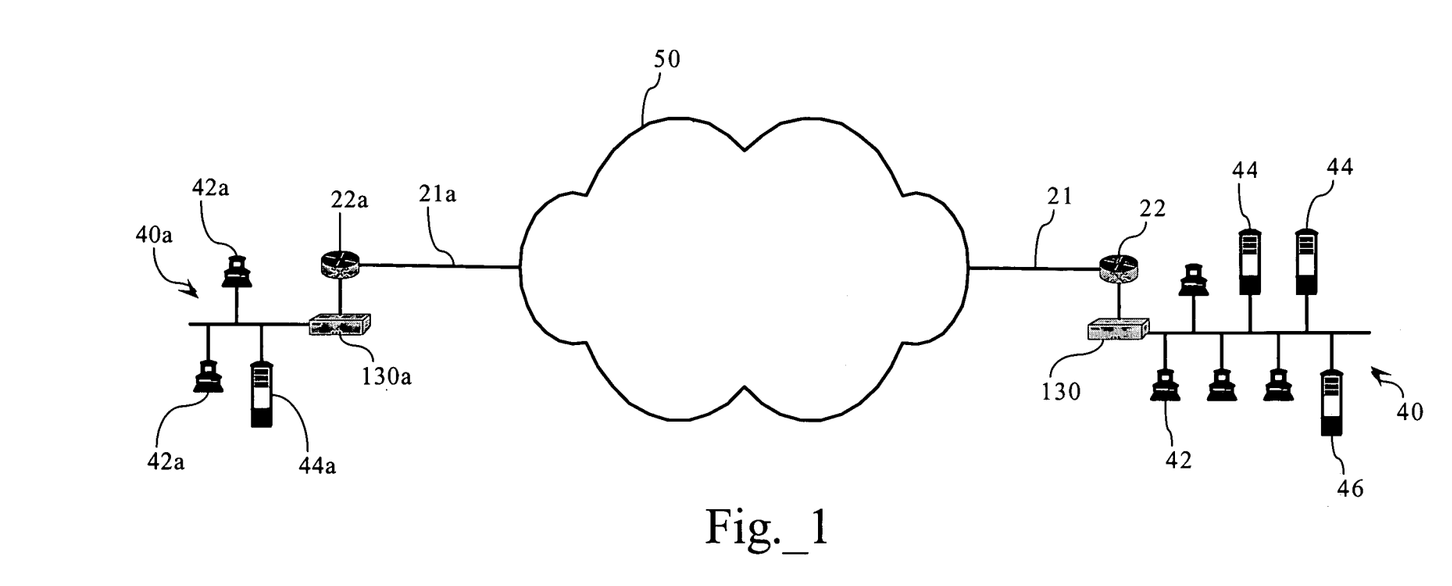
FIG. 1 illustrates a network environment in which an embodiment of the present invention may operate.

FIG. 1 illustrates a packet-based computer network environment including data flow devices 130, 130a. As FIG. 1 shows, computer network 40 interconnects several end systems or nodes (including client devices 42, application servers 44 and remote access server 46), and provides access to resources operably connected to computer network 50 via router 22 and access link 21. Similarly, computer network 40a interconnects client devices 42a and application servers 44a, and provides access to resources operably connected to computer network 50 via router 22a and access link 21a. Computer networks 40, 40a can be a Local Area Network (LAN), a Wireless Local Area Network (WLAN), a Wide Area Network (WAN), or any other suitable network or combination of the foregoing networks. The computer network environment, including computer network 50, in one implementation, is a packet-based communications environment, employing TCP/IP protocols (for example) and has a plurality of interconnected digital packet transmission stations or routing nodes.

As FIG. 1 shows, data flow device 130 is provided between router 22 and computer network 40, while data flow device 130a is disposed between router 22a and server computer network 40a. As discussed in more detail below, data flow devices 130, 130a include gateway functionality operative to intercept remote access sessions between remote access clients and remote access servers, and de-multiplex the remote access sessions to enhance QoS and other data flow management operations. Data flow devices 130, 130a, in one implementation, are further operative to identify routing nodes or other network devices (such as each other) along a communications path to a destination host that include compatible gateway capabilities. In addition, data flow devices 130, 130a may also be operative to establish compression tunnels with each other to accelerate the flow of data.

Remote access server 46 allows for thin-client and/or remote access to applications hosted on one or more application servers 44. In one implementation, remote access server 46 operates in connection with a remote access client application executing on client device 42a (for example). In one implementation, remote access server 46 and the remote access client application interact by establishing a remote access session, and using a thin client protocol that separates display screen updates and user input processing (e.g., mouse and keyboard inputs) from the remainder of the application processing. This session enables the user to access server-based applications that appear to run locally on the client device 42a but execute on the server. In one implementation, screen updates, user input processing and other events are packetized into command packets, and aggregated into metaframes for transmission across the network. In one implementation, various command data types are associated with different virtual channels, such as screen updates, printer traffic, mouse movements, keyboard strokes and the like. In addition, the frames may each include one or more priority tags (typically in framing headers) that can be used to indicate the relative priorities of the frames. In one implementation, the remote access server 46 and the remote access client application are configured to implement the Citrix® Independent Computing Architecture functionality and protocols. Typically, the remote access session between the remote access server 46 and the remote access client application uses a single, persistent TCP/IP connection; however, the present invention can also be used in connection with remote access protocols that use other transport layer protocols and multiple connections.

Figure 2:
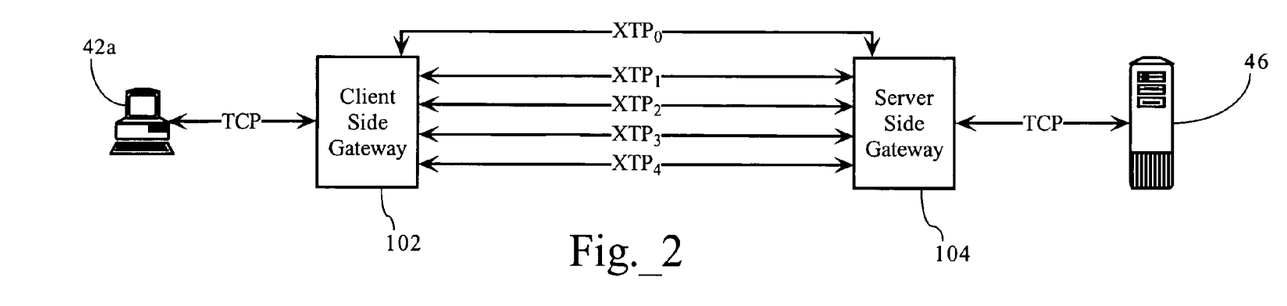
FIG. 2 is a functional block diagram illustrating the connections established by a client side and server side gateway, according to one implementation of the present invention, to de-multiplex a remote access session.

FIG. 2 illustrates the session de-multiplexing functionality implemented by client-side gateway 102 and server-side gateway 104 disposed in a communications path between remote access server 46 and a remote access client 42a. As discussed above, the remote access session between remote access server 46 and remote access client 42a, in one implementation, typically utilizes a single, persistent transport layer connection (such as a TCP persistent connection). As FIG. 2 illustrates, client-side gateway 102 intercepts and terminates the TCP connection initiated by remote access client 42a. In addition, in response to the initiation of the TCP connection by remote access client 42a, server-side gateway 104 initiates a TCP connection with remote access server 46. As FIG. 2 further illustrates, client-side gateway 102 and server-side gateway 104 establish a plurality of transport layer connections ($XTP_{1-4}$), which in one implementation are dedicated to the remote access session between remote access server 46 and remote access client 42a. As FIG. 2 illustrates, client-side gateway 102 and server-side gateway 104, in one implementation, also communicate control and other connection data over a separate transport layer connection ($XTP_0$). In one implementation, this connection is used to transmit control data between the client-side gateway 102 and server-side gateway 104, as well as remote access handshake messages between remote access server 46 and remote access client 42a before dedicated transport layer connections are established.

Figure 3:
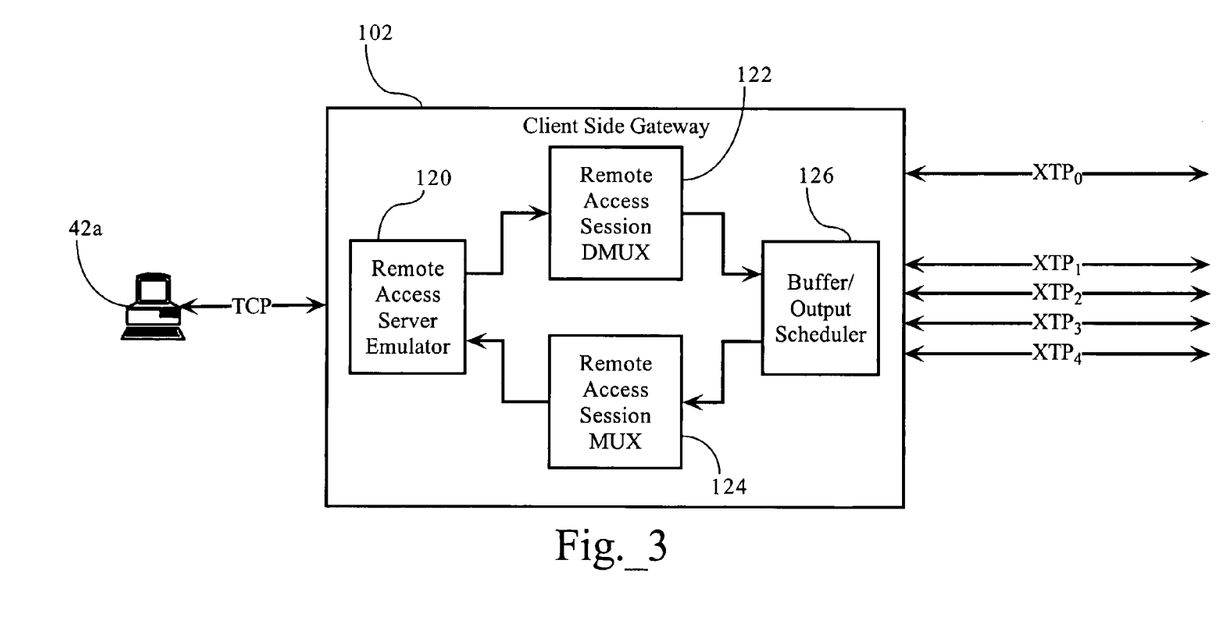
FIG. 3 is a block diagram setting forth functionality corresponding to a client-side gateway.

FIG. 3 is a functional block diagram illustrating functionality corresponding to client-side gateway 102 according to one implementation of the present invention. As FIG. 3 shows, client-side gateway 102 comprises remote access server emulator 120, remote access session demultiplexer 122, remote access session multiplexer 124, and buffer/output scheduler 126. Remote access server emulator 120, in one implementation, is operative to emulate remote access server 46 to the extent necessary to intercept and terminate the TCP connection initiated by remote access client 42a as part of the remote access session. In some implementations, remote access server emulator 120 is operative to emulate or spoof the remote access server 46 during the initial handshake that sets up the remote access session. In this manner, remote access server emulator 120 can control certain optional aspects of the remote access session, such as turning off encryption and/or compression modes to facilitate the session de-multiplexing functionality described herein, and/or allowing the gateways to use alternative compression/encryption methods. Remote access session demultiplexer 122 is operative to receive data frames formatted according to a remote access protocol (e.g., the ICA protocol), and process the data frames, as discussed more fully below, to de-multiplex the remote access session into separate data streams for transmission to server-side gateway 104. As discussed in more detail below, remote access session demultiplexer 122 may operate to demultiplex remote access sessions based on priority tags or identifiers, and/or based on virtual channel identifiers.

Remote access session multiplexer 124 is operative to receive remote access session data (separated by remote access session demultiplexer 122 into a plurality of separate data streams) over the connections between client-side gateway 102 and server-side gateway 104, and multiplex the data streams into the remote access protocol for transmission over the transport layer connection to the appropriate destination host. Buffer/output scheduler 126 is operative, in the transmit direction, to receive remote access data for transmission over a connection between client-side gateway 102 and server-side gateway 104. In one implementation, de-multiplexed remote access data is stored in a queue corresponding to one of the connections ($XTP_{1-4}$) and scheduled for transmission by buffer/output scheduler 126. In this manner, buffer/output scheduler 126 can arbitrate among the queues in a manner that implements a differentiated QoS scheme for different components of the remote access session between remote access server 46 and remote access client 42a. In the receive direction, buffer/output scheduler 126 is operative to receive and buffer remote access session data received over the connection(s) between client-side gateway 102 and server-side gateway 104. As discussed in more detail below, remote access session multiplexer 124 processes the buffered remote access session data for transmission to the appropriate remote access session endpoint.

Figure 4:
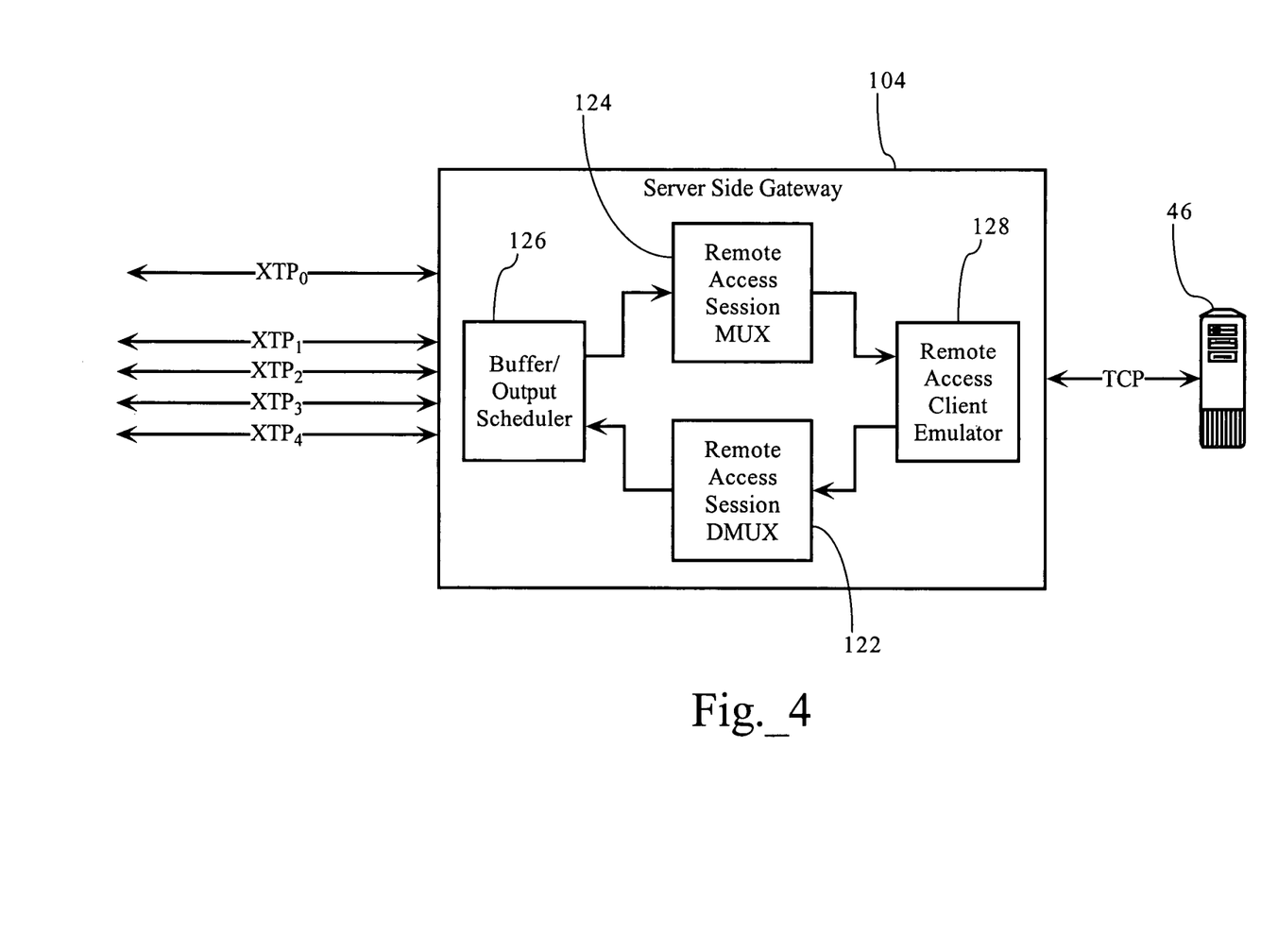
FIG. 4 is a block diagram showing functionality corresponding to a server-side gateway.

Similarly, FIG. 4 is a functional block diagram that shows functionality corresponding to server-side gateway 104. As FIG. 4 shows, server-side gateway 104, in one implementation, comprises remote access client emulator 128, remote access session demultiplexer 122, remote access session multiplexer 124, and buffer/output scheduler 126. Remote access session demultiplexer 122 and remote access session multiplexer 124 operate in the same or substantially the same manner as those components in client-side gateway 102. Remote access client emulator 128 is operative to emulate a remote access client to the extent necessary to terminate the transport layer connection and remote access session with remote access server 46. In some implementations, remote access client emulator 128 is operative to emulate or spoof the remote access client 42a during the initial handshake that sets up the remote access session. In this manner, remote access client emulator 128, operating in concert with remote access server emulator 120, can control certain optional aspects of the remote access session, such as turning off encryption and/or compression modes to facilitate the session de-multiplexing functionality described herein.

Figure 5:
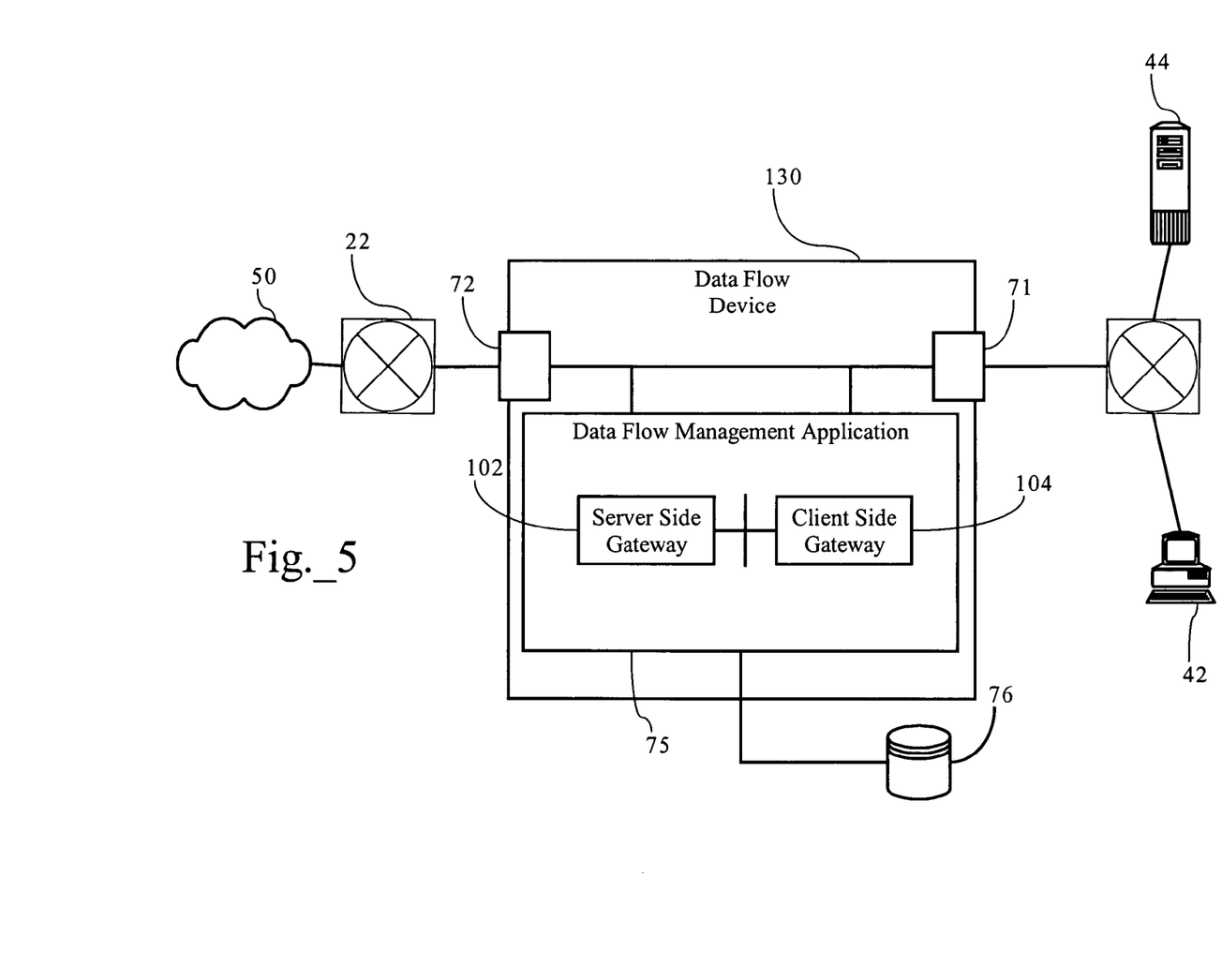
FIG. 5 is a block diagram illustrating the general configuration of a network device including server-side and client side gateway functionality.

Lastly, FIG. 5 illustrates the overall configuration of data flow device 130. As FIG. 5 illustrates, data flow device 130, in one implementation, comprises data flow management application processor 75, and first and second network interfaces 71, 72, which operably connect data flow device 130 to the communications path between router 22 and network 40. Data flow management application processor 75 generally refers to the functionality implemented by data flow device 130, such as the client side gateway, server side gateway functionality, and the like. In one embodiment, data flow management application processor 75 is a combination of hardware and software, such as a central processing unit, memory, a system bus, an operating system, device drivers, and one or more software modules implementing the functions performed by data flow device 130. As FIG. 5 shows, data flow device 130 may comprise client-side gateway 102 and server-side gateway 104 to selectively operate as required to provide enhanced QoS to remote access sessions for remote access clients and remote access servers connected to network 40. However, data flow device 130 may be configured to include only server-side gateway 104, while data flow device 130a (for example) may be configured to include only client-side gateway 102. In addition, data flow control devices 130, 130a may also include other functionality. For example, in one implementation, data flow device 130 is configured to include compression and tunneling functionality, such as that disclosed in U.S. application Ser. No. 10/015,826. The above-identified patents and patent applications, incorporated by reference herein, disclose various functionalities and features that may be incorporated into data flow devices according to various implementations of the present invention.

In one embodiment, first and second network interfaces 71, 72 are the hardware communications interfaces that receive and transmit packets over the computer network environment. In one implementation, first and second network interfaces 71, 72 reside on separate network interface cards operably connected to the system bus of data flow device 130. In another implementation, first and second network interfaces reside on the same network interface card. In addition, the first and second network interfaces 71, 72 can be wired network interfaces, such as Ethernet (IEEE 802.3) interfaces, and/or wireless network interfaces, such as IEEE 802.11, BlueTooth, satellite-based interfaces, and the like. As FIG. 5 illustrates, data flow device 130, in one embodiment, includes persistent memory 76, such as a hard disk drive or other suitable memory device, such writable CD, DVD, or tape drives. In other implementations, data compression device 130 can include additional network interfaces, beyond network interfaces 71 and 72, to support additional access links or other functionality. Furthermore, U.S. application Ser. No. 10/843,185 provides a description of the operation of various modules (according to one possible implementation of the present invention), such as network interface drivers, and data structures for receiving into memory and processing packets encountered at network interfaces 71, 72.

In one implementation, data flow devices 130 can be manually configured with the network address of one or more partner network devices (e.g., 130a) and corresponding network reachability information for the partner network device(s). For example, a network administrator, in one implementation, can configure data flow device 130 with the network address of data flow device 130a and the network addresses or subnet range(s) corresponding to the end systems connected to network 40a. In another implementation, data flow device 130 can include functionality that dynamically probes for partner data flow devices. For example, U.S. application Ser. No. 10/015,826 discloses technologies directed to dynamically probing for intermediate network devices along a communications path to an end host. One of ordinary skill in, the art will recognize how to apply the probing functionality disclosed therein to discover partner data flow devices, such as data flow devices 130a.

B. Operation

In one implementation, client-side gateway 102 and server-side gateway 104 include logic processing to effectively handle different stages of the remote access session. For example, client-side gateway 102 and server-side gateway 104, in one implementation, are configured to transparently process handshake messages exchanged between remote access client 42a and remote access server 46. In one implementation, client-side gateway 102 and server-side gateway 104 forward handshake messages over a transport layer connection (e.g., $XTP_0$) between them. Client-side gateway 102 and server-side gateway 104, after the handshake results in a remote access session, are operative to demultiplex the remote access session into a plurality of data streams, and transmit the remote access session data over one or more connections between the client-side gateway 102 and the server-side gateway 104.

In one implementation, the connections between client-side gateway 102 and server-side gateway 104 are transport layer connections. In one implementation, client-side gateway 102 and server-side gateway 104 employ the Xpress Transport Protocol (XTP) to establish reliable and efficient transport layer connections. U.S. Pat. Nos. 6,460,085 and 6,529,477 disclose gateway architectures that split TCP connections and use the XTP protocol for transmission of data between gateways. Of course, other implementations are possible. For example, client-side gateway 102 and server-side gateway 104 may use the TCP protocol, SCPS, or any other suitable transport layer protocol. In one implementation, client-side gateway 102 and server-side gateway 104 may re-use persistent TCP connections as need for new sessions to reduce the time associated with the TCP connection handshake and possibly the slow-start phase of the TCP connection. Furthermore, data flow devices 130, 130a may also include compression, encryption and/or tunneling technologies to transmit data securely, and/or accelerate data transmission, between client-side gateway 102 and server-side gateway 104.

B.1. Remote Access Handshake Processing

Figure 6:
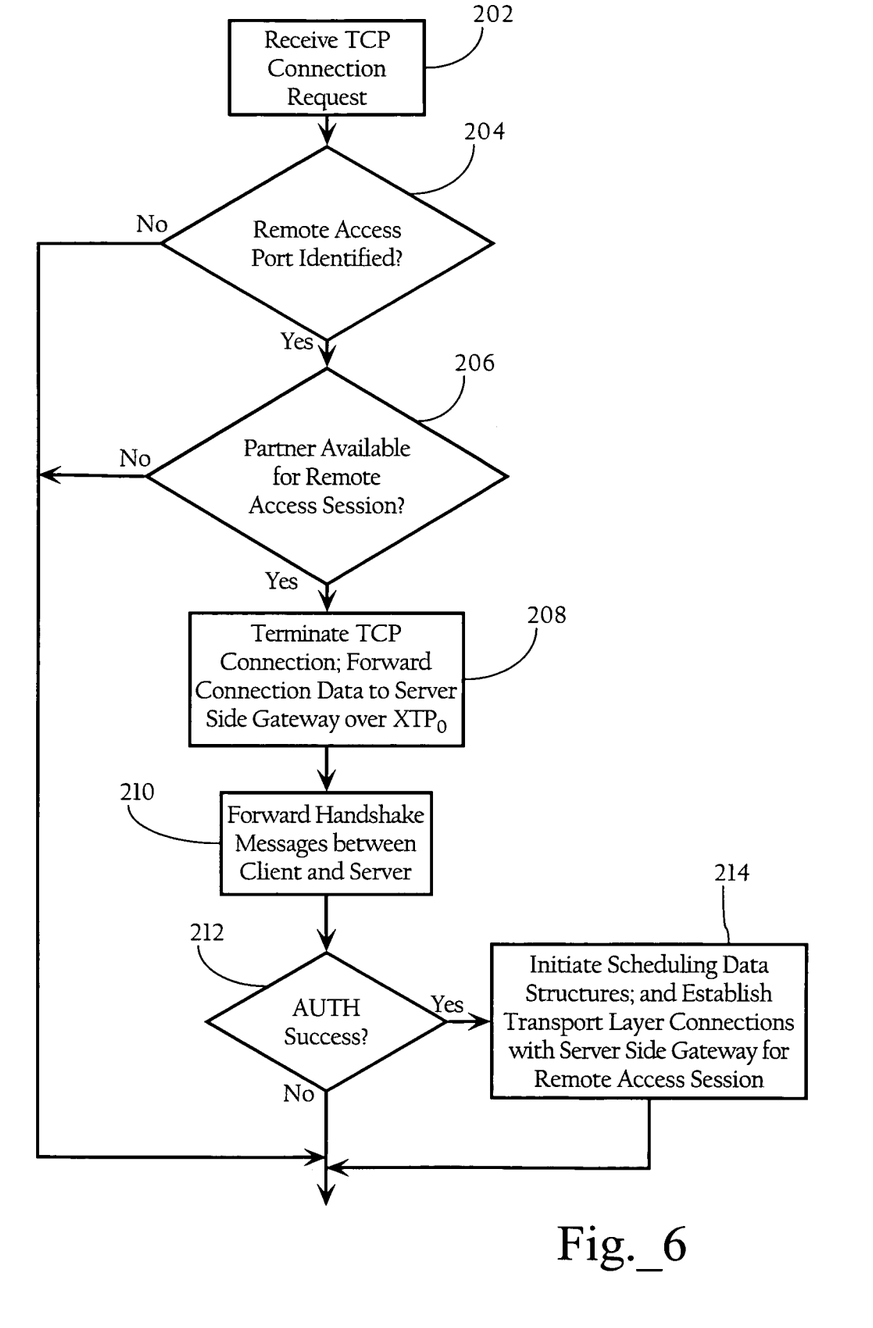
FIG. 6 is a flow chart diagram illustrating a process, according to one implementation of the present invention, for processing an initial handshake at a client-side gateway.

FIG. 6 illustrates a process, implemented at client-side gateway 102, directed to processing the initial handshake between a remote access client 42a and remote access server 46. As FIG. 6 illustrates, when client-side gateway 102 receives a transport layer connection request (e.g., a TCP SYN packet) (202), it inspects the port number contained in the transport layer connection request. If the port number corresponds to a remote access session (e.g., port 1494 for Citrix® ICA protocol sessions) (204), client-side gateway 102 then determines whether a server-side gateway 104 is available for the remote access session (206). In one implementation, this is determined by inspecting the destination address of the transport layer connection request and determining whether a server-side gateway 104 has network reachability to the identified remote access server 46. Other implementations are possible. In an alternative embodiment, client-side gateway 102 can terminate all TCP connections and monitor for the remote access handshake to identify a remote access session. Detection of the remote access handshake, in some implementations, is accomplished by monitoring for a string or signature particular to the remote access protocol employed by the remote access client and remote access server. As discussed above, in another implementation, remote access server emulator 120 can also be configured to perform the handshake with the remote access client 42, and pass on authentication information to server side gateway 104 for use by remote access client emulator 128 in a separate handshake with remote access server 46.

As FIG. 6 provides, client-side gateway 102 then acknowledges the transport layer connection request and forwards the connection data to server-side gateway 104 over the control connection (XTP0) (208). In one implementation, client-side gateway 102 splits or intercepts the connection by transmitting a TCP SYN/ACK packet using the network address of the identified remote access server 46 as the source address of the packet. In one implementation, client-side gateway 102 forwards the connection data to server-side gateway 104 by encapsulating the transport layer connection request in a tunneling header and transmitting it to server-side gateway 104. In other implementations, client-side gateway 102 can parse the transport layer connection request and transmit attribute information necessary for server-side gateway 104 to establish a transport layer connection with the identified remote access server 46. Thereafter, client-side gateway 102 forwards the handshake messages it receives from remote access client 42a and remote access server 46 via server-side gateway 104 (210). Client-side gateway 102 also monitors the handshake messages for an indication that the handshake was successful (212). If so, client-side gateway 102, in one implementation, establishes one or more transport layer connections with server-side gateway 104 for the remote access session, and instantiates the queuing and scheduling data structures required to maintain the connections and perform the operations described herein (214).

Figure 7:
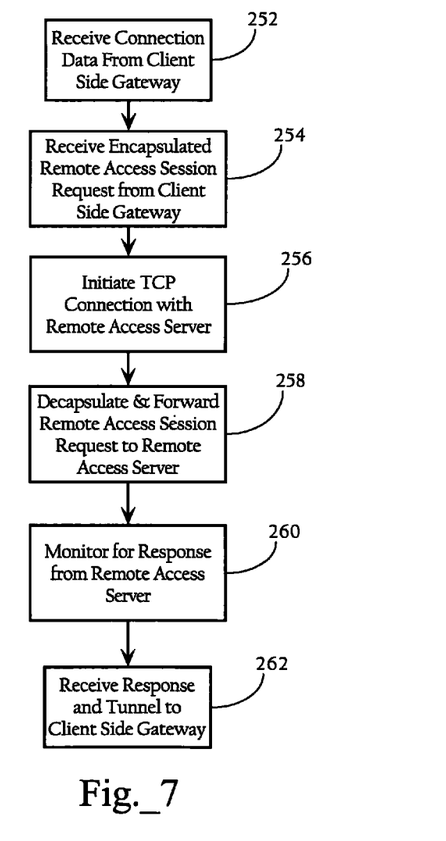
FIG. 7 is a flow chart diagram illustrating a process, according to one implementation of the present invention, for processing an initial handshake at a server-side gateway.

FIG. 7 illustrates a process flow, implemented by server-side gateway 104, for processing the initial handshake between a remote access client 42a and remote access server 46. In one implementation, server-side gateway 104 monitors the XTP0 connection, and receives transport layer connection data from client-side gateway 102, as discussed above (252). In one implementation, when server-side gateway 104 receives the remote access session request, which client-side gateway 102 encapsulated and transmitted over the XTP0 connection (254), it initiates a transport layer connection with remote access server 46 using the network address of the remote access client 42a (256). In addition, server-side gateway 104, in one implementation, decapsulates the remote access session request from remote access client 42a and forwards it remote access server 46. Similar to client-side gateway 102, server-side gateway 104 monitors for a response from remote access server 46 (260), encapsulating and forwarding it to client-side gateway 102 (262). In one implementation, server-side gateway 104 can also be configured to monitor the handshake to determine whether it was successful in addition to, or in lieu of, client-side gateway 102.

Other implementations are possible. As discussed above, for example, remote access server emulator 120 of client-side gateway 102 can be configured to intercept the remote access session request transmitted by remote access client 42a, and issue a challenge response to cause remote access client 42a to transmit authentication information that is passed to server-side gateway 104. Remote access server emulator 128 of server-side gateway 104, in turn, uses the authentication information to perform the initial handshake with remote access server 46. As discussed above, remote access server emulator 120 and remote access client emulator 128, in some implementations, can be configured to turn off compression and/or encryption modes supported by the remote access session protocol to facilitate the de-multiplexing operations described herein. One skilled in the art will recognize that the processing of the initial handshake depends on the authentication and other communications protocols employed by remote access client 42a and remote access server 46.

B.2. Remote Access Session De-Multiplexing

In one implementation, after the initial handshake, client-side gateway 102 and server-side gateway 104, in one implementation, set up one to a plurality of transport layer connections for the remote access session between remote access client 42a and remote access server 46. In one implementation, remote access server 46 and remote access client 42a implement a remote access session protocol that includes metaframes that include a priority tag (e.g., one or more bits that indicate a priority tag). In addition, each metaframe may include one to a plurality of command packets each associated with respective virtual channels. As discussed in more detail below, client-side gateway 102 and server-side gateway 104 can be configured to operate on the metaframe level, or process the metaframes to resolve the command packets and thus operate on the virtual channel level. In either embodiment, the remote access session is de-multiplexed into a plurality of separate data streams for transport over corresponding connections between client-side gateway 102 and server-side gateway 104. In this manner, a differentiated QoS mechanism can be more easily applied to the de-multiplexed data streams, as opposed to packets or metaframes with a single stream.

For didactic purposes, client-side gateway 102 and server-side gateway 104 are described as operating in connection with Citrix® ICA protocol sessions between remote access client 42a and remote access server 46. The Citrix® ICA protocol, in one current implementation, includes a priority tagging scheme where the priority bits are included in a metaframe header. In one implementation, the priority tag is two bits in length, allowing for 4 different priority tags. According to one implementation, therefore, client-side gateway 102 and server-side gateway 104 initiate four transport layer connections (XTP1-4) for the transmission of remote access session data.

Figure 8A:
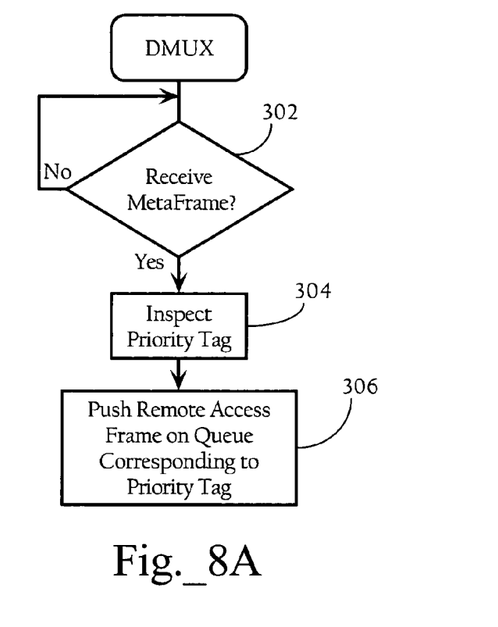
FIGS. 8A and 8B are flow chart diagrams illustrating the remote access session demultiplexing and multiplexing functionality according to a first implementation of the present invention.

FIG. 8A illustrates a process, according to one implementation of the present invention, executed by remote access session demultiplexer 122. When remote access session demultiplexer receives a metaframe (302), it inspects the priority tag in the header of the metaframe (304) and pushes the received metaframe on the queue or other buffering data structure corresponding to the priority tag and the remote access session between remote access client 42a and remote access server 46. As discussed above, in one implementation, there is a one-to-one correspondence between the priority tag scheme and the number of connections between client-side gateway 102 and server-side gateway 104 for each remote access session. Operating in a separate process from remote access session demultiplexer 122, buffer/output scheduler 126 arbitrates among the queues within the given remote access session, as well as across all remote access sessions, to schedule frames for transmission across the connections. In one implementation, the metaframes transmitted across the connections between client-side gateway 102 and server-side gateway 104 are encapsulated in a manner similar to the handshake messages discussed above. The remote access session de-multiplexing functionality set forth above facilitates the application of a differentiated QoS scheme to the metaframes on a priority tag basis across network 50.

Figure 8B:
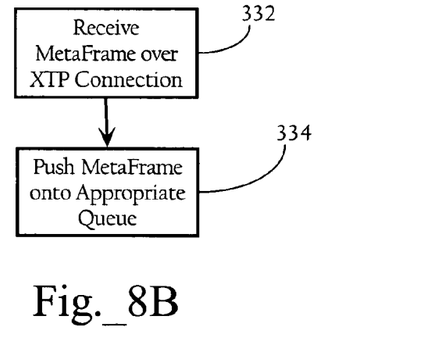

FIG. 8B illustrates a process, according to one implementation of the present invention, executed by remote access session multiplexer 124 in response to metaframes that were received across the connections between client-side gateway 102 and server-side gateway 104. In one implementation, metaframes are received by buffer/output scheduler 126 (332) and buffered in a queue corresponding to the remote access session between remote access client 42a and remote access server 46 (334). Remote access session multiplexer 124 then schedules the metaframes for transmission to either the remote access client 42a or remote server 46 as appropriate.

Figure 9A:
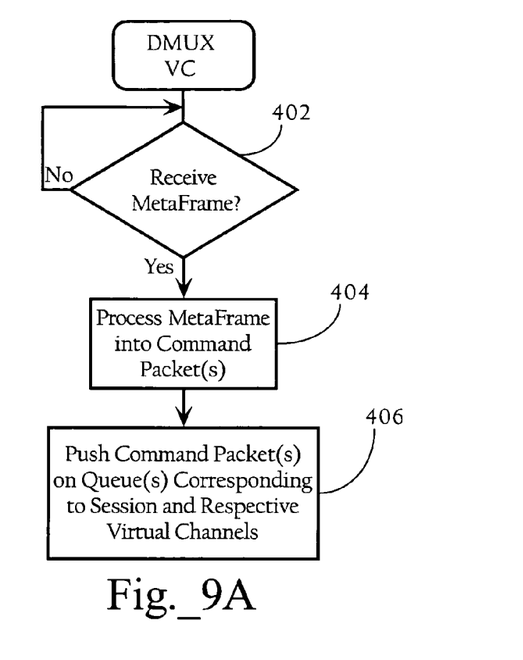
FIGS. 9A and 9B are flow chart diagrams illustrating the remote access session demultiplexing and multiplexing functionality according to a second implementation of the present invention.

As discussed above, the de-multiplexing and multiplexing functionality of client-side gateway 102 and server-side gateway 104 may operate on a per virtual channel basis. As FIG. 9A provides, when remote access session demultiplexer 122 receives a metaframe (402), it processes the metaframe or a series of metaframes to extract the command packets contained in the metaframes (404). In implementations involving Citrix® ICA protocol sessions, remote access session demultiplexer 122 includes ICA protocol stack functionality or aspects thereof to yield ICA command packets from the metaframes. Remote access session demultiplexer 122 then pushes the command packets on the queues corresponding to the remote access session and the respective virtual channel(s). In one implementation, there is a one-to-one relationship between the number of queues for a given remote access session and the number of virtual channels. In other implementations, several virtual channels may map to a given queue. For example, each transport connection queue (XTP1-4) may correspond to multiple virtual channels for a given remote access session. In one implementation, the queues or other buffering structures, and the corresponding XTP connections, can be created between the client-side gateway 102 and the server-side gateway 104 on demand, as the corresponding data stream types (e.g., virtual channel or priority tag data) are encountered. As discussed above, buffer/output scheduler 126 arbitrates among the queues to transmit command packet data over the connection between the client-side gateway 102 and the server-side gateway 104. In addition, the de-multiplexing functionality described herein allows for the application of traffic policies, as well as the generation of measurement data, on a virtual channel and/or priority tag basis. In one implementation, buffer/output scheduler 126 applies policies on an intra-remote access session basis, and an inter-session basis (where the sessions may include remote access sessions and other session types (e.g., HTTP).

Figure 9B:
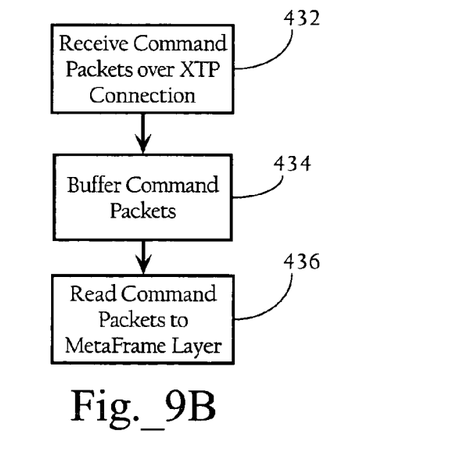

FIG. 9B sets forth a process, according to one implementation, executed by remote access session multiplexer 124. As FIG. 9B illustrates, command packets received over a connection between client-side gateway 102 and server-side gateway 104 (432) are buffered by buffer/output scheduler 126 (434). In one implementation, buffer/output scheduler 126 maintains a receive queue for each transport layer connection (e.g., XTP1, XTP2, etc.) between the client-side gateway 102 and server-side gateway 104. Remote access session multiplexer 124 reads the buffered command packets into a metaframe protocol layer to construct one or more meta frames for transmission to remote access client 42a or remote access server 46 as appropriate (436). In one implementation, remote access session multiplexer 124 arbitrates among the receive queues corresponding to a given remote access session based on the relative priority associated with each receive queue/connection. In addition, the remote access session multiplexer 124 arbitrates among the receive queues on a remote access session basis, in one implementation, based on the status of the connections (e.g., the size of the TCP window, etc.) between the gateway (either client-side or server-side) and the corresponding remote access session endpoint(s) (e.g., remote access client 42a, or remote access server 46).

Lastly, although the present invention has been described as operating in connection with end systems and networks employing the TCP, IP and Ethernet protocols, the present invention has application in computer network environments employing any suitable transport layer, network layer and link layer protocols. Still further, the present invention can be used in connection with a wide variety of application protocols that multiplex virtual channel data, or data corresponding to a data differentiated relative to an axis, over a transport layer connection. For example, the present invention can be implemented between hosts implementing the Session Control Protocol (SCP), and the SMUX protocol, a specification for which was written by Gettys et al, SMUX Protocol Specification, (W3C Working Draft 10 Jul. 1998), http://www.w3.org/TR/1998/WD-mux-19980710. Still further, the client-side and server-side gateway functionality described herein can be incorporated into other network architectures and devices, such as the satellite gateways disclosed in U.S. Pat. Nos. 6,460,085 and 6,529,477. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method comprising
   de-multiplexing, at a first gateway, a remote access session between a remote access server executing on a first host and a remote access client executing on a second host into a plurality of data streams, wherein de-multiplexing the remote access session comprises
      receiving, over a first transport layer connection during the remote access session, from the remote access client input/output data associated with one or more input/output devices of the second host; and
      separating the input/output data received from the remote access client into the plurality of data streams, each of the data streams associated with a virtual channel of the remote access session or an access priority, the input/output data separated into the plurality of data streams according to the type of input/output data;
   transmitting the plurality of data streams across a network over corresponding transport layer connections to a second gateway;
   monitoring a handshake between the remote access client and the remote access server; and
   establishing at least one connection between the first gateway and the second gateway in response to a successful handshake between the remote access client and the remote access server.

2. The method of claim 1 further comprising
   multiplexing, at the second gateway, the remote access session data received in the plurality of data streams from the first gateway.

3. The method of claim 1 further comprising
   applying a QoS mechanism to the plurality of data streams.

4. The method of claim 3 wherein the applying step comprises prioritizing at least one of the plurality of data streams over at least a second data stream of the plurality of data streams.

5. The method of claim 1 wherein the remote access session between the remote access server and the remote access client utilizes a single, persistent transport layer connection.

6. The method of claim 5 further comprising
   splitting, at the first gateway, the single, persistent transport layer connection; and
   establishing at least one connection with a second gateway.

7. The method of claim 6 further comprising
   further splitting the single, persistent transport layer connection at the second gateway.

8. The method of claim 1 further comprising
   intercepting, at the first gateway, a handshake message from the remote access client; and
   forwarding information relating to the handshake message to the second gateway.

9. The method of claim 8 further comprising
   transmitting a second handshake message from the first gateway to the remote access client, wherein the second handshake message comprises an authentication challenge; and
   forwarding information relating to an authentication response from the remote access client to the second gateway.

10. The method of claim 1 wherein at least one of the corresponding connections is a transport layer connection.

11. The method of claim 10 wherein the transport layer connection is a TCP connection.

12. The method of claim 10 wherein the transport layer connection is a XTP connection.

13. The method of claim 1 further comprising
    compressing at least one of the data streams for transmission to the second gateway.

14. The method of claim 1 further comprising
    encrypting at least one of the data streams for transmission to the second gateway.

15. The method of claim 1 further comprising
    receiving screen update data of the remote access session from the second gateway; and
    transmitting the screen update data to the remote access client over the first transport layer connection.

16. A gateway operative in a network comprising a remote access server and a remote access client, wherein the remote access client and the remote access server are operative to transmit remote session data using a remote access session protocol, the gateway, comprising
    at least one network interface;
    a processor;
    a memory;
    a data flow management application, stored in the memory, comprising instructions operable to cause the processor and the at least one network interface to
    de-multiplex a remote access session between a remote access server and a remote access client into a plurality of data streams, wherein de-multiplexing the remote access session comprises
       receiving, over a first transport layer connection during the remote access session, from the remote access client input/output data associated with one or more input/output devices of the second host; and
       separating the input/output data received from remote access client into the plurality of data streams, each of the data streams associated with a virtual channel of the remote access session or an access priority, the input/output data separated into the plurality of data streams according to the type of input/output data;
    transmit the plurality of data streams across a network over corresponding transport layer connections to a second gateway;
    monitor a handshake between the remote access client and the remote access server; and
    establish at least one connection between the first gateway and the second gateway in response to a successful handshake between the remote access client and the remote access server.

17. The gateway of claim 16 wherein the data flow management application further comprises instructions operable to cause the processor and the at least one network interface to
    receive data streams corresponding to a remote access session from a remote gateway; and
    multiplex the data streams into a remote access session protocol; and
    transmit the multiplexed remote access session data over a single transport layer connection to a remote access session endpoint.

18. The gateway of claim 16 wherein the data flow management application further comprises instructions operable to cause the processor and the at least one network interface to apply a QoS mechanism to the plurality of data streams.

19. The gateway of claim 18 wherein the QoS mechanism is operative to prioritize at least one of the plurality of data streams over at least a second data stream of the plurality of data streams.

20. The gateway of claim 16 wherein the remote access session between the remote access server and the remote access client utilizes a single, persistent transport layer connection.

21. The gateway of claim 16 wherein the data flow management application further comprises instructions operable to cause the processor and the at least one network interface to
intercept a handshake message from the remote access client; and
forward information relating to the handshake message to the second gateway.

22. The gateway of claim 21 wherein the data flow management application further comprises instructions operable to cause the processor and the at least one network interface to
transmit a second handshake message from the first gateway to the remote access client, wherein the second handshake message comprises an authentication challenge; and
forward information relating to an authentication response from the remote access client to the second gateway.

23. The gateway of claim 16 wherein at least one of the corresponding connections is a transport layer connection.

24. The gateway of claim 16 wherein the data flow management application further comprises instructions operable to cause the processor and the at least one network interface to compress at least one of the data streams for transmission to the second gateway.

25. The gateway of claim 16 wherein the data flow management application further comprises instructions operable to cause the processor and the at least one network interface to encrypt at least one of the data streams for transmission to the second gateway.

26. A method, comprising
receiving, at a first gateway, one or more meta frame packets transmitted between a remote access client and a remote access server during a remote access session, wherein each of the meta frame packets comprises one or more command packets each associated with a virtual channel of a plurality of virtual channels, wherein a first virtual channel of the plurality of virtual channels comprises keystroke input data transmitted from the remote access client to the remote access server, and wherein a second virtual channel of the plurality of virtual channels comprises mouse movement data transmitted from the remote access client to the remote access server; and
de-multiplexing, at the first gateway, the remote access session between the remote access server and the remote access client into a plurality of data streams by
extracting the command packets from the meta frame packets;
transmitting one or more of the extracted command packets across a network over a first transport layer connection to a second gateway; and
transmitting one or more of the other extracted command packets across the network over a second transport layer connection to the second gateway.

27. The method of claim 26 wherein transmitting the extracted command packets comprises
buffering the command packets on a plurality of queues, wherein each of the plurality of queues is associated with select ones of the plurality of virtual channels;
arbitrating among the plurality of queues to select command packets for transmission according to a prioritization scheme.

* * * * *